June 1, 1954 J. B. PARSONS 2,679,763
REVERSE GEAR OPERATING SYSTEM FOR MARINE ENGINES
Filed Aug. 18, 1952 6 Sheets-Sheet 1
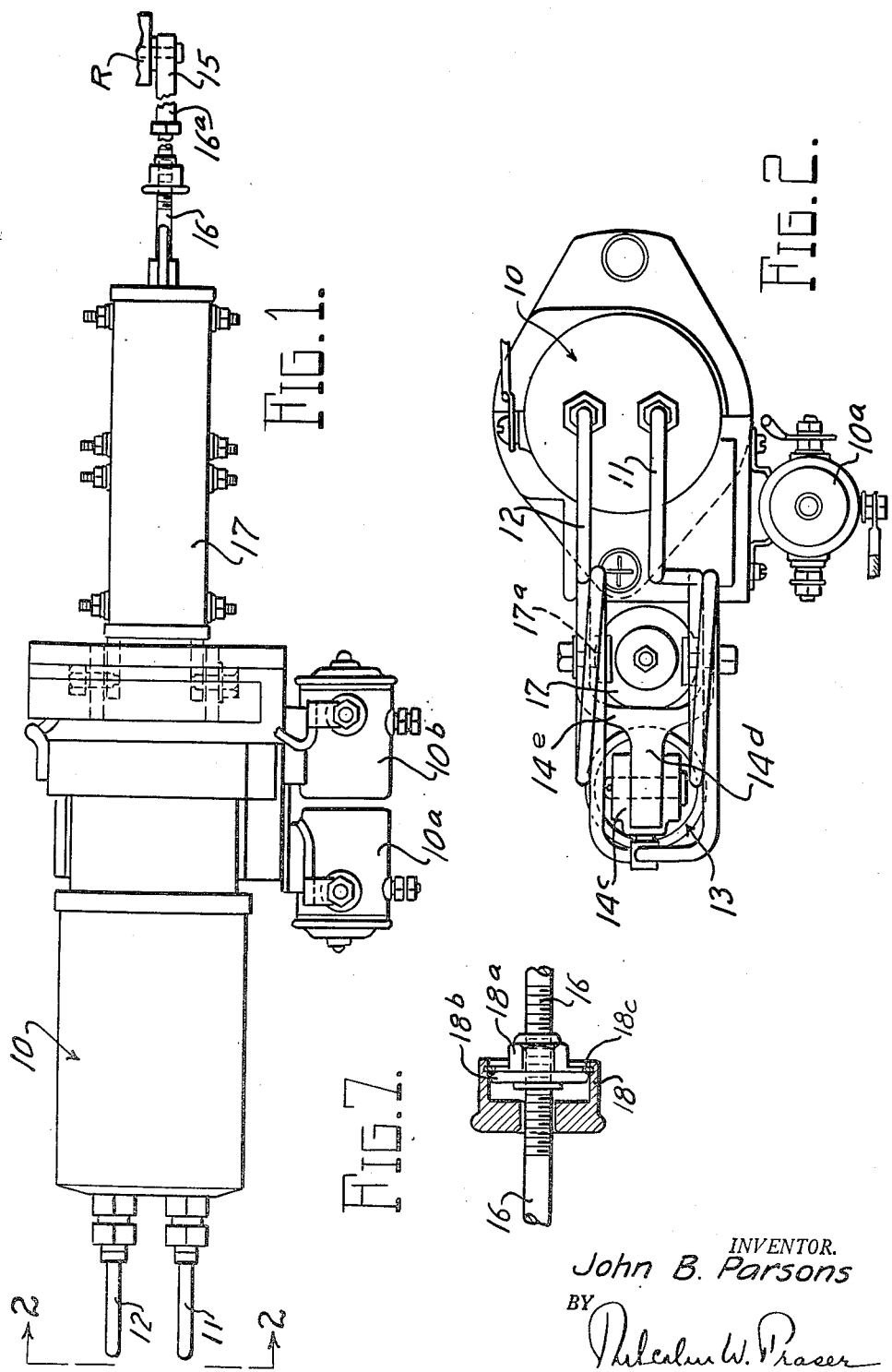
INVENTOR.
John B. Parsons
BY
*Malcolm W. Fraser*
ATTORNEY

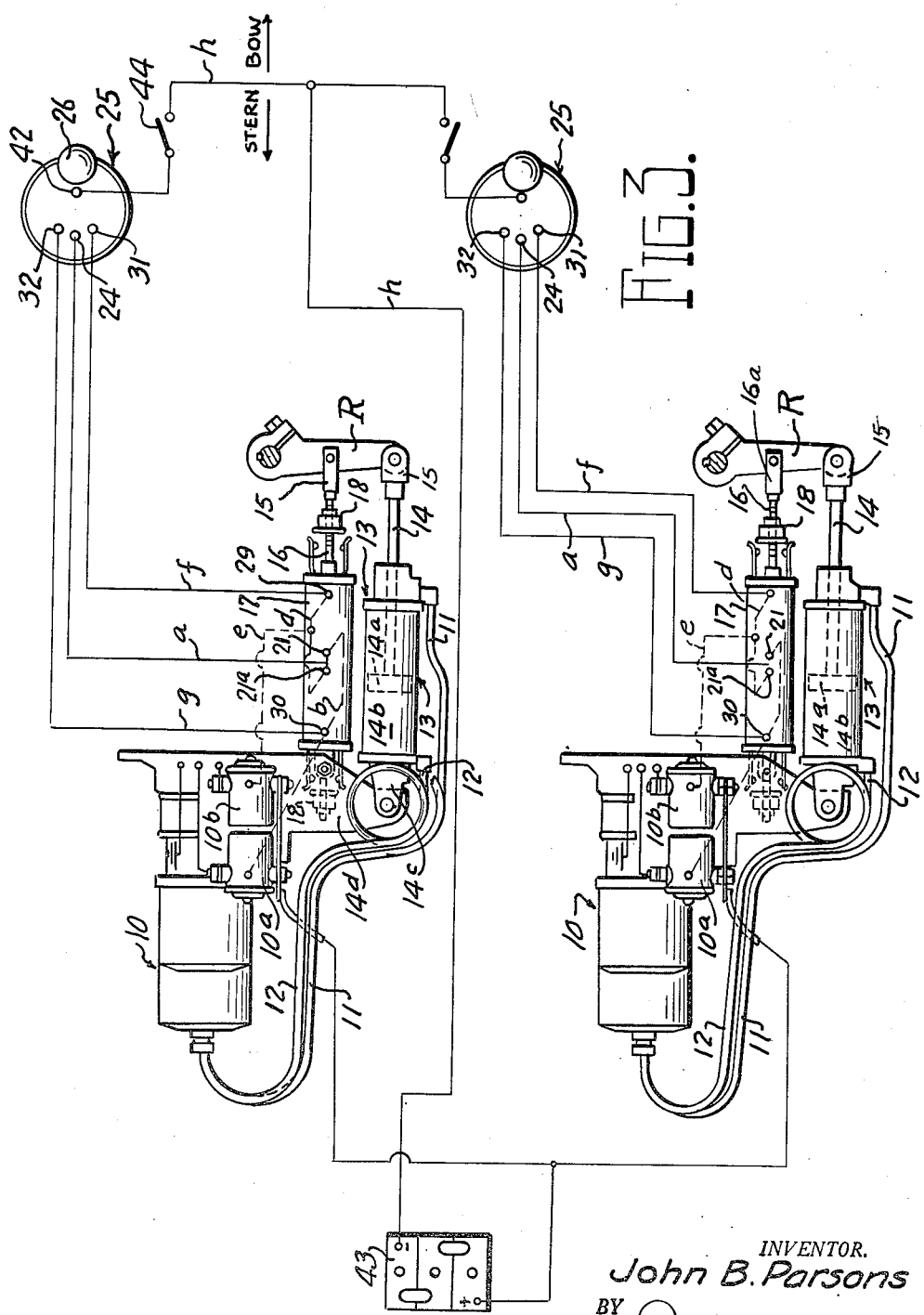

June 1, 1954    J. B. PARSONS    2,679,763
REVERSE GEAR OPERATING SYSTEM FOR MARINE ENGINES
Filed Aug. 18, 1952    6 Sheets-Sheet 3
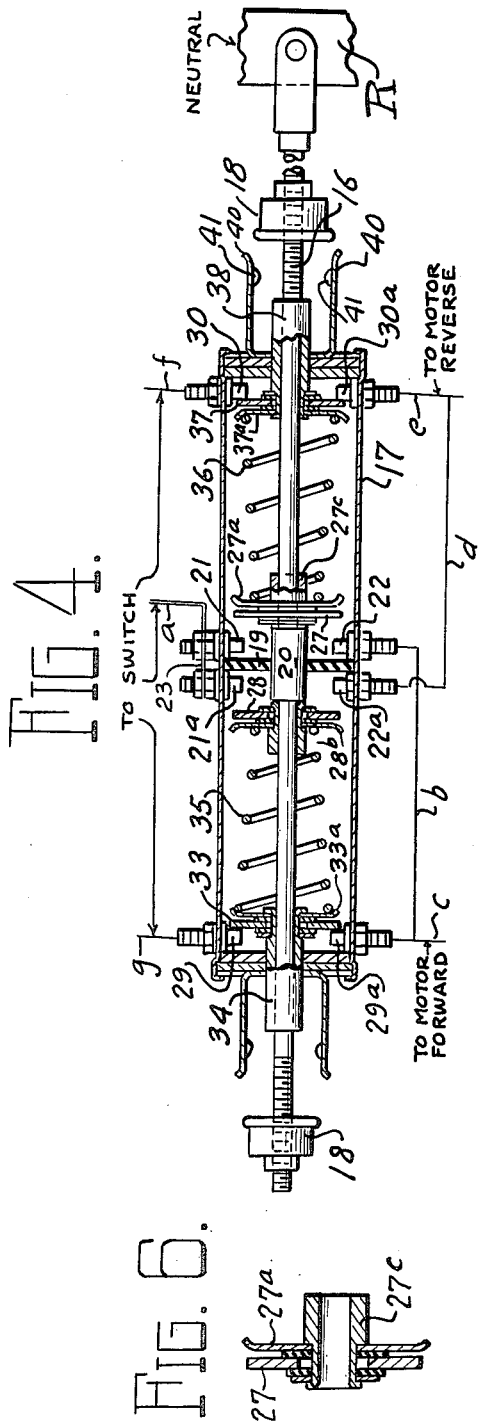
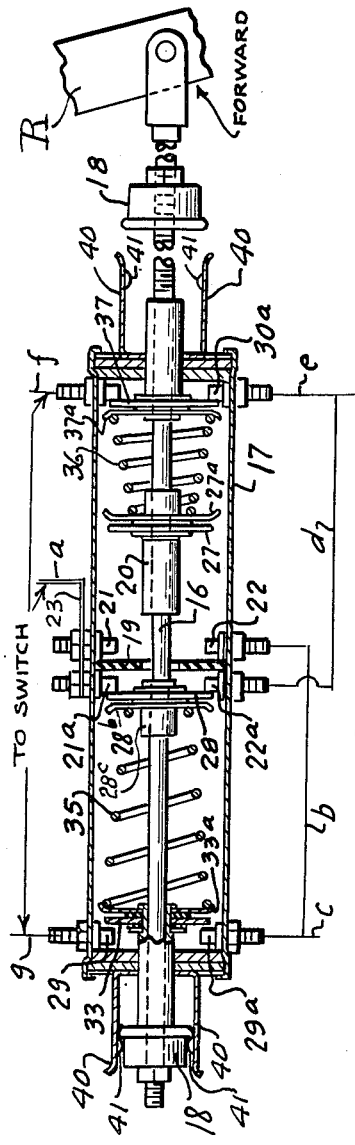
INVENTOR.
John B. Parsons
BY
ATTORNEY

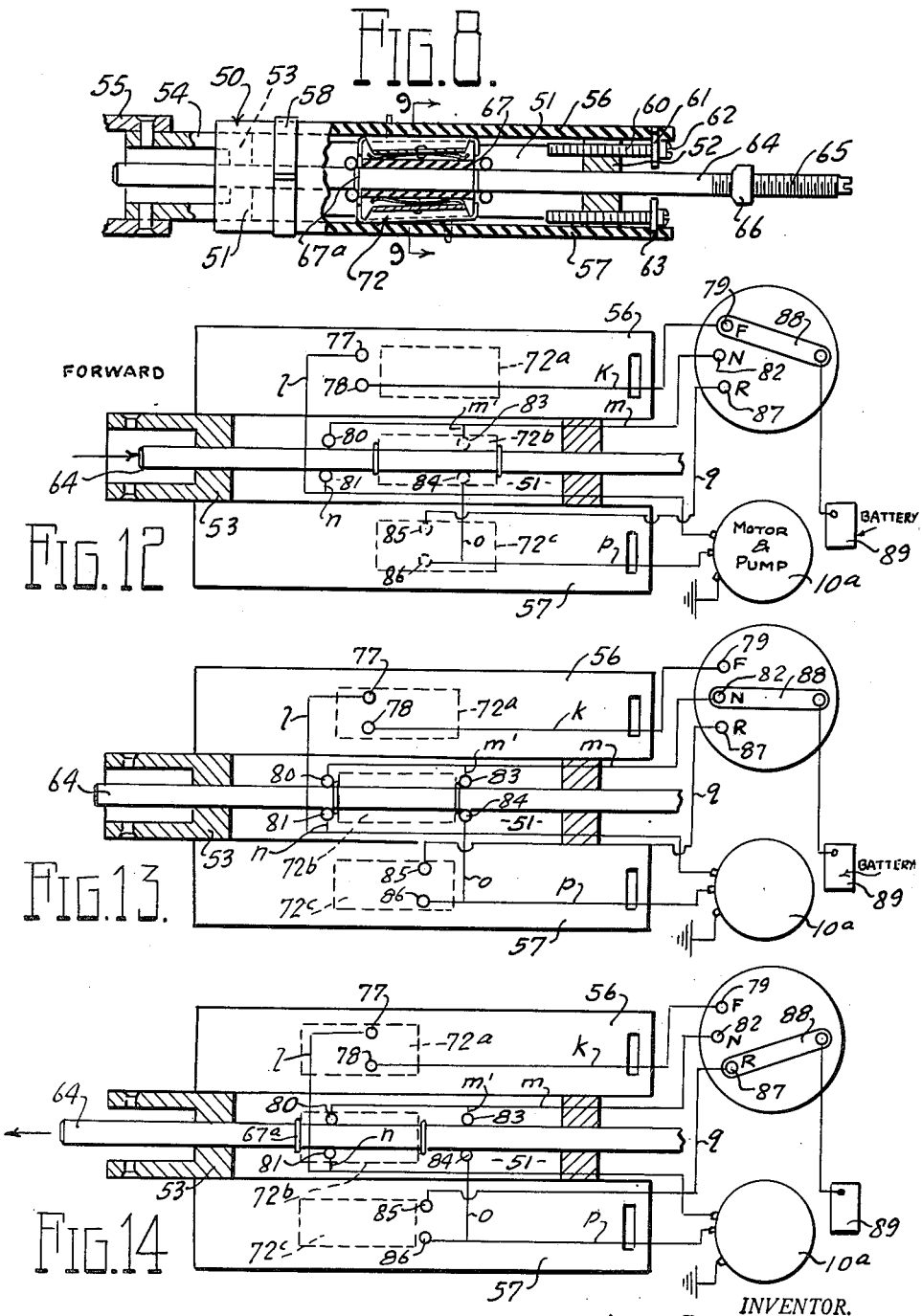

June 1, 1954 J. B. PARSONS 2,679,763
REVERSE GEAR OPERATING SYSTEM FOR MARINE ENGINES
Filed Aug. 18, 1952 6 Sheets-Sheet 5
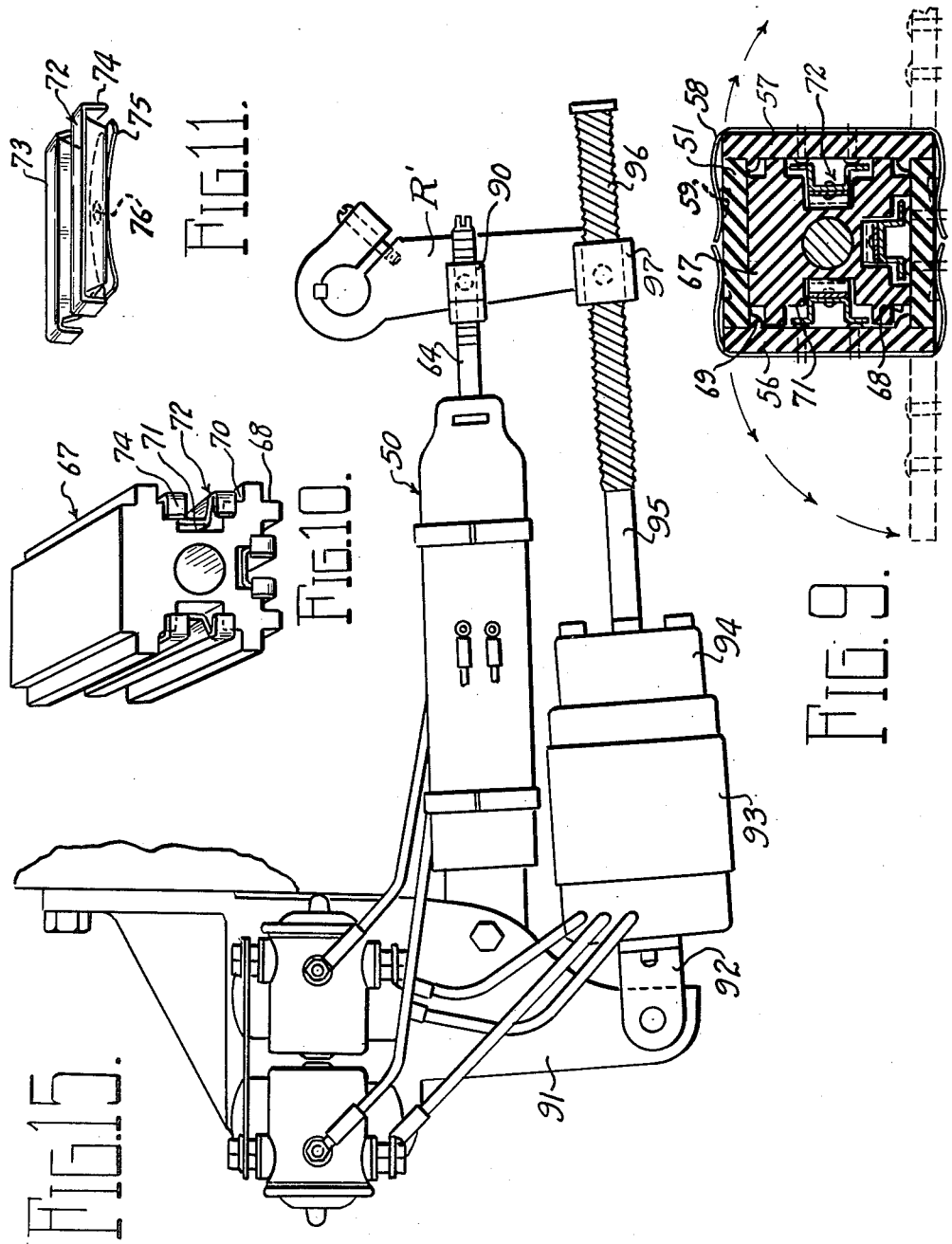
INVENTOR.
John B. Parsons
BY
ATTORNEY

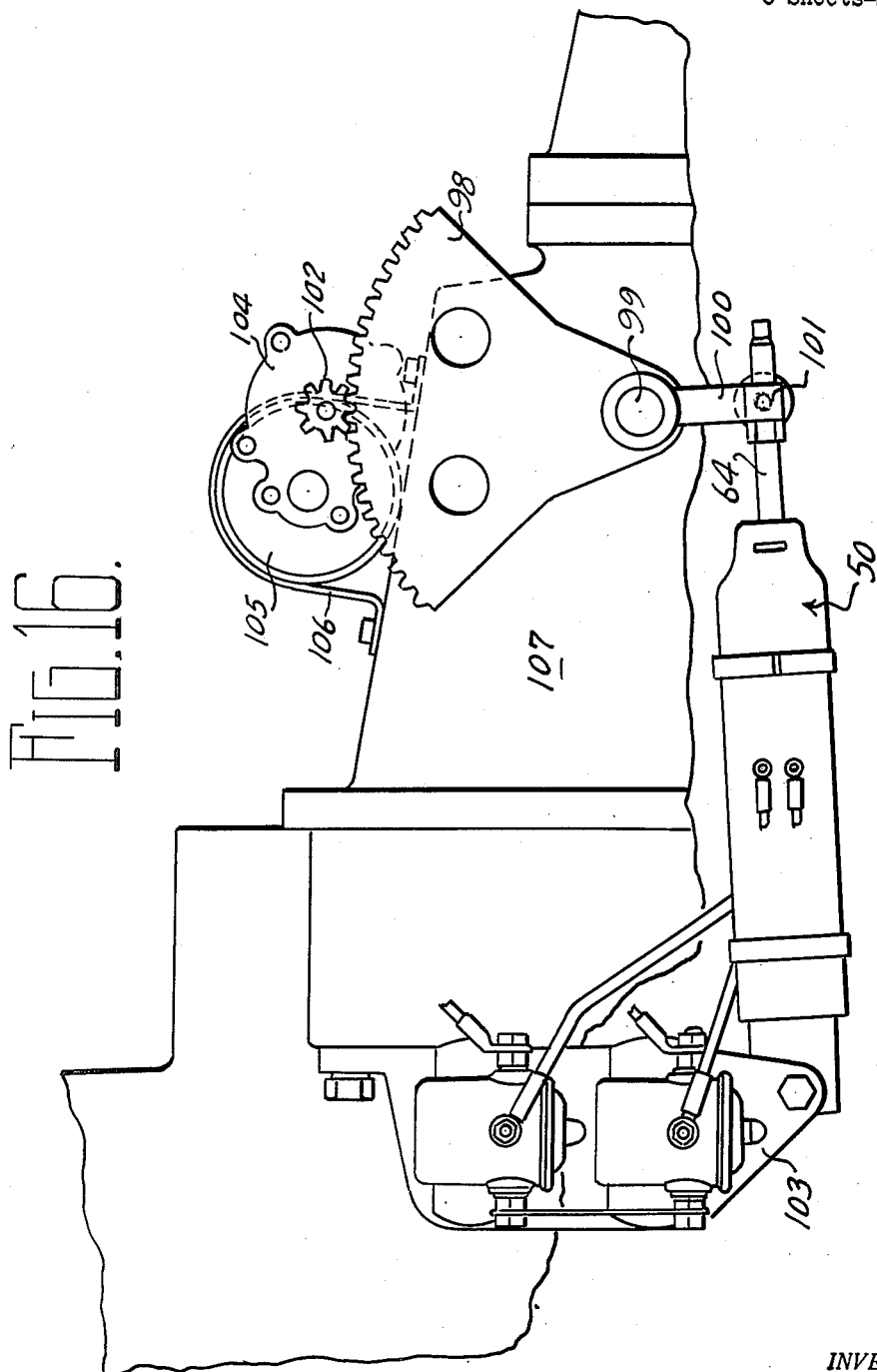

Patented June 1, 1954

2,679,763

UNITED STATES PATENT OFFICE 2,679,763

REVERSE GEAR OPERATING SYSTEM FOR MARINE ENGINES

John B. Parsons, Maumee, Ohio

Application August 18, 1952, Serial No. 304,937

18 Claims. (Cl. 74—364)

This invention relates to reverse gear operating mechanisms for marine craft, but more particularly to the automatic control of the reverse gear mechanism, and an object is to produce a new and improved system for controlling the operation of the reverse gear of marine craft to enable such gear to be simply, easily and efficiently operated.

Another object is to produce a system for positively actuating the reverse gear mechanism for marine engines by power means such as hydroelectric or electric mechanism, responsive to a simply actuated manual switch device which may be located in a convenient position on the craft.

A further object is to produce a new and improved circuit selector for controlling the operation of the reverse gear actuating mechanism which insures the proper movement of the parts between "neutral," "forward" and "reverse" position.

Other objects and advantages will hereinafter appear, and for purposes of illustration but not of limitation, embodiments of the invention are shown on the accompanying drawings, in which Figure 1 is a top plan view of the automatic mechanism for actuating the reverse gear lever of a marine craft;

Figure 2 is an end elevation viewed from the line 2—2 of Figure 1, the mechanism shown in the latter figure;

Figure 3 is a side elevation showing two automatic mechanisms such as would be employed for controlling the operation of the twin screw cruiser, each mechanism being connected to operate one of the reverse gear mechanisms;

Figure 4 is a longitudinal sectional view of the circuit selector by which the electrically operated linear motor is controlled, the parts being shown in the neutral position of the reverse gear lever;

Figure 5 is a sectional view similar to Figure 4, but showing the position of the parts when the reverse gear arm is in its forward position;

Figure 6 is a sectional view showing one of the sleeves and the contact discs mounted thereon and illustrating the assembly of these parts;

Figure 7 is an enlarged sectional view of one of the pusher cups or clutch elements which are engaged by spring fingers carried by the ends of the cylinder containing the automatic control device;

Figure 8 is a side view partly in elevation and partly in longitudinal section of a modified form of circuit selector;

Figure 9 is an enlarged transverse sectional view on the line 9—9 of Figure 8;

Figure 10 is a perspective view on an enlarged scale of the slide and contact sleds carried thereby employed in the circuit selector shown on Figure 8;

Figure 11 is a perspective view of one of the contact sleds;

Figures 12 to 14 are diagrammatic views of the circuit selector shown on Figures 8 to 11 in the different positions thereof, specifically with the control switch in forward, in neutral, and in reverse positions respectively, these figures being taken as though the adjustable side panels of the selector were laid flat and in alignment with a fixed side panel of the selector, as indicated generally on Figure 9;

Figure 15 is a side elevation of an alternate form of reverse gear operating mechanism in which movement of the reverse gear arm is effected by a reversible electric motor operating through a screw-threaded operating shaft; and Figure 16 is a side elevation of a further form of reverse gear operator in which the actuating movement is effected by a reversible electric motor operating a gear sector.

The illustrated embodiment of the invention comprises a motor and pump assembly 10, the unit including a reversible electric motor, the windings of which are controlled by relays 10a and 10b, a hydraulic pump and a liquid reservoir. From the power unit 10 extend tubes 11 and 12, the former extending to the left-hand end (Figure 2) of a linear motor 13, and the latter extending to the right-hand end of the motor. Since the motor and pump assembly forms no part of the present invention, detail description and illustration are not considered necessary. However, one satisfactory unit is shown and described in my co-pending application Serial No. 173,526, filed July 13, 1950.

The linear motor 13 includes a piston rod 14 having a piston 14a which is horizontally reciprocable within a cylinder 14b. The left-hand end of the cylinder has a bifurcated portion 14c which is pivotally connected to the bracket 14d and the outer end of the piston rod 14 is pivoted by a yoke 15 to a reverse gear arm R of a marine engine. The mechanism above and hereinafter described is duplicated, and although in Figure 1 the two controls are shown, description of one is regarded as sufficient inasmuch as the two structures are identical. It will be readily understood by those skilled in this art that the reverse gear actuating arm R through suitable clutch mechanism (not shown) controls the direction of rotation of the drive or propeller shaft whether to drive the craft forwardly or rearwardly. In the neutral position of the arm R, manifestly no propelling force is imparted.

From the above description, it will be understood that when the power unit 10 is operated in one direction, the piston 14a will be driven, for example, outwardly with respect to the cylinder 14b, thereby to shift the actuating arm R to the right of Figure 2, or to the forward position. On the other hand, operation of the power unit 10 in the opposite direction will move the arm R to the left of Figure 2, or to the reverse operating position. The intermediate or up and down position of the arm R places the gear in its neutral or inoperative position. To effect such operation of the linear motor 13, an electrical control is provided and as shown, a longitudinally shiftable rod 16 is connected by a yoke 16a to the reverse gear control lever R inwardly from the yoke 15 so that the rod 16 reciprocates through a shorter distance than does the piston rod 14. The rod 16 extends through a cylinder 17, opposite ends of which are closed by discs apertured to permit longitudinal shifting movement of the rod. The left-hand end of the cylinder 17 is pivotally connected at 17a to a yoke-like portion 14e of a stationary bracket 14d.

The opposite ends of the rod 16 are formed with screw-threaded portions and on each threaded portion is a self-locking nut 18a which can be adjusted axially of the rod to the desired position. The nut 18a has an annular flange 18b which has limited sliding movement within a cup 18 having a flanged head. A split ring 18c within the cup limits the movement of the nut relative to the cup 18. The flange of the cup snaps into engagement respectively with spring arms 40 secured to the respective closure discs at the ends of the cylinder 17. The outer ends of the spring arms 40 are flared outwardly and detents 41 are adapted to engage over the respective cup flange, thereby to retain the cup yieldingly against movement. The limited lost motion afforded the cups 18 enables limited movement of the reverse gear arm R after it has been rocked to one or another position of adjustment. Thus the spring arms hold the cup 18 in its opposite limits of movement from unwarranted or accidental shifting movement but the lost motion allows the reverse gear arm R to have a slight amount of movement without breaking the electrical circuit which has been established.

Fixedly mounted in the central portion of the cylinder 17 is an insulating plate or disc 19 which is centrally apertured to enable a collar 20 fixed on the rod 16 to slide therethrough. On opposite sides of the insulating disc 19 and projecting through the walls of the cylinder 17 is a set of contact posts 21 and 21a. Posts 22 and 22a are also arranged on opposite sides of the disc 19 but diametrically opposite to the posts 21 and 21a respectively. The contact posts 21 and 21a are connected together by a bus bar 23 from which extends a lead $a$ to a contact 24 on a manually operated rotatable switch unit 25 provided with an operating knob 26 to enable the switch to be rocked to a selected position. From the contact 22 extends a lead $b$ to join a lead $c$ extending to the relay 10a controlling one field of the reversible motor. From the contact post 22a extends a lead $d$ which joins a lead $e$ which extends to the relay 10b controlling the other motor field. Thus the lead $c$ controls the rotation of the electric motor in one direction and the lead $e$ controls the rotation of the electric motor in the opposite direction. Conductive discs 27 and 28 are arranged on opposite sides of the collar 20 and are slidably mounted on the rod 16 to electrically connect respectively the contacts 21 and 22 and the contacts 21a and 22a, as will hereinafter appear.

At one end of the cylinder 17 is a set of contact posts 29 and 29a arranged diametrically opposite each other and at the opposite end of the cylinder is a set of similarly arranged contact posts 30 and 30a. The contact posts 29 and 30 are connected by leads $f$ and $g$ respectively to contacts 31 and 32 on the control switch 25 and the posts 29a and 30a are connected to the motor relay leads $c$ and $e$ respectively, as above mentioned.

At one end of the cylinder 17 for electrically connecting the binding posts 29 and 29a is a contact disc 33. The disc 33 is mounted on the reduced forward end of a sleeve 34 which is slidable on the shiftable rod 16. As shown, the disc 33 is clamped between a pair of insulating discs and the central apertured portion of the disc is out of contact with the sleeve 34. At the forward end of this assembly is a cupped washer 33a and the entire assembly is held in position on the sleeve 34 by flanging the outer end of the reduced extension. It will be manifest that the contact disc 33 and associated parts are movable along with the sleeve 34 and the latter is normally urged toward the contact posts 29 and 29a by a coil spring 35, one end of which seats on the washer 33a. Movement of the sleeve 34 to the right of Figure 5 is effected by the cup 18, as will hereinafter appear, thereby to move the disc away from the contact posts 29 and 29a for breaking the circuit. The opposite end of the coil spring 35 bears against a washer 28b which is associated with the contact disc 28, but insulated therefrom, the arrangement of the contact disc 28 and associated parts being similar to the contact disc assembly 33 above described, this assembly being carried by a hub portion 28c which is slidable on the shiftable rod 16.

Another coil spring 36 is interposed between cupped washers 27a and 37a which are associated and movable with conductive discs 27 and 37 respectively. The disc 27 is similar to the disc 28 in its assembly and similarly slides axially upon the rod 16 on the hub 27c. The disc 37 is mounted on a sleeve 38 and that assembly is similar to the sleeve 34 and disc 33 assembly above described. The conductive disc 37 is adapted to engage the contact posts 30 and 30a for enabling current to pass to the lead $e$ which extends to the relay 10b of the reversible motor.

The rockable switch 25 has a contact 42 from which extends the lead $h$ to a source of current, in this instance a battery 43 and interposed in this line is a switch 44 for controlling the flow of current from the battery to the rockable switch unit 25.

Referring to Figure 4, the reverse gear arm is in neutral position and at the time it will be noted that the contact disc 33 is in engagement with the contact posts 29 and 29a and also that the contact disc 37 is in engagement with the contact posts 30 and 30a. Consequently, the reverse gear mechanism may be shifted in either direction, depending upon whether current is delivered through the lead $c$ to the relay 10a or delivered through the lead $e$ to the relay 10b, it being understood that one relay controls the rotation of the reversible electric motor in one direction whereas the other relay controls the rotation of the motor in the opposite direction. Let us assume that it is desired to shift the reverse gear to its forward operating position, requiring the shifting of the control arm R to the right of the figure, then the knob 26 of the rockable switch 25 is grasped and the switch rocked until the switch contacts 32 and 42 are electrically connected. In this manner, current passes through the lead g to the contact post 29 through the conductive disc 33 to the contact post 29a and through the lead c to the relay 10a thereby energizing the field of the reversible electric motor so that the pump will force liquid to the inner end of the cylinder 14b to drive the piston 14a to the right of Figure 3 (either mechanism) and such movement of the piston 14a through the piston rod 14 will cause the arm R to rock in a counterclockwise direction. Such movement of the reverse gear arm R imparts corresponding movement to the shiftable rod 16 and as the rod 16 travels to the right of the figure, the sleeve or collar 20 which is fixed to it will move accordingly to the right and allow the spring 35 to move the contact disc 28 into engagement with the contact posts 21a and 22a. When the contact disc 28 engages the adjacent posts, the cup 18 at the left-hand end of the rod 16 will have moved the sleeve 34 to the right of the figure sufficiently to shift the contact disc 33 away from the contact posts 29 and 29a, thereby breaking that circuit and deenergizing the pump operating motor. The reverse gear arm R will now be in its "forward" operating position and will remain there until the main control switch 25 is either shifted to "neutral" or "reverse" position. The cup 18 at the left-hand end of the rod 16 is retained in that position by its engagement with the spring arms 40 and the detents 41. When in that position and as shown on Figure 5, the disc 28 will have engaged the contacts 21a and 22a; also the disc 37 is in engagement with the contacts 30 and 30a. Both of these circuits lead to the relay 10b which controls the windings of the motor which cause the motor to rotate in a reverse direction for introducing liquid under pressure in front of the piston 14a of the linear motor 13 to drive it to the left of Figure 3. Thus by shifting the manual switch 25 so that the contacts 42 and 31 are connected to bring current to the contact post 30 through the lead f thereby transmitting current through the contact disc 37 to the post 30a and thence through the lead e to the relay 10b, the electric motor will be energized in the reverse direction for actuating the reverse gear arm R to the left or reverse direction. Such movement will continue until the assembly at the right-hand end portion of the rod 16 and which includes a cup 18 will have moved the sleeve 38 sufficiently so that the contact disc 37 is moved away from its contact posts when the electric motor is deenergized.

When the parts are in "forward" or "reverse" position, one or the other of the discs 27 and 28 is in contact with the respective posts so that by placing the control switch 25 in its neutral position so that the contact 24 is electrically connected to the live contact 42, current passes to the center contact posts and causes the parts to travel to their intermediate or neutral position by effecting rotation of the electric motor and consequently the hydraulic pump in one direction or the other. In this manner, the reverse gear arm R is moved to its intermediate or neutral position and upon reaching that position, the circuit is automatically broken since the collar 20 shifts one or the other of the contact discs 27 and 28 from their respective contact posts. In this intermediate position as shown on Figure 4, both of these control discs are away from their contact posts.

An alternate form of circuit selector is shown on Figures 8 to 14 and comprises an elongate plastic cylinder which is square in cross section and is generally indicated by the reference numeral 50. The cylinder 50 has integral oppositely arranged flat sides 51 which are united adjacent their opposite end portions by integral cross or web blocks 52 and 53 having central holes aligned with each other. At one end of the cylinder 50 and integrally connected to the sides 51 is a cuplike extension 54 which is pivotally connected to a pair of spaced supporting bracket arms 55, thereby enabling the cylinder 50 to rock in one plane. Closing the two oppositely arranged open sides of the cylinder 50 are flat rectangular side panels 56 and 57 which abut against the edge portions of the sides 51. For holding the side panels 56 and 57 in place is a pair of spring clips 58 (Figure 9) arranged adjacent opposite end portions of the cylinder. Each spring clip has a struck-out shoulder part 59 at each end thereof to snap into notches formed in the fixed or integral panels 51 of the cylinder.

Formed in the web block 52 is a pair of tapped holes to receive longitudinally arranged screws 60 and each screw 60 has adjacent its head a rigid annular flange 61, the head 62 being grooved to receive a screw driver to enable the screw to be turned for adjustment purposes. The annular flanges 61 of the screw 60 fit into rectangular slots 63 respectively, this arrangement being such that by turning one screw or the other, the respective side panel 56 or 57 may be adjusted longitudinally with respect to the cylinder. The purpose of this adjustment will be described later on.

Extending longitudinally through the cylinder 50 and slidable through the holes in the web blocks 52 and 53 is an operating rod 64 which is formed with a screw-threaded end portion 65 at the outer end, there being a lock nut 66 on the end portion 65. It will be understood that this end portion is adjustably connected to a nut carried by the reverse gear lever such, for example, as the lever R hereinabove described. Mounted on the intermediate portion of the operating rod 64 is a slide 67 (Figure 10) of plastic or other suitable electrical insulating material. The slide 67 is generally rectangular in formation and is held in place on the rod 64 by snap rings 67a disposed in grooves in the rod at opposite ends of the slide. In this manner, the slide 67 is connected to the operating rod 64 for translatory shifting movements therewith. As shown, the slide 67 has longitudinal grooves 68 which extend longitudinally and are arranged in pairs at the top and bottom. These grooves receive elongate guide ribs 69 (Figure 9) on the movable side panels 56 and 57.

Formed in each of three sides of the slide 67 is a relative wide shallow groove 70 which extends from end to end of the slide and countersunk below each groove 70 is a smaller groove 71 which also extends from end to end of the slide. Fitting the grooves 70 and 71 in each instance is a sled 72 of suitable electrically conducting sheet metal. Each sled is generally U-shaped in form with the base of the U fitting into the countersunk groove 71. Extending at right angles are elongate oppositely extending side flanges 73 which extend from end to end of the slide 67 and on the end of each flat flange 72 is an outwardly turned tab 74 to engage the adjacent end of the slide for holding the sled in the desired position so that it will move along with the slide 67. A bowed leaf spring 75 engages the bottom of the groove 71 in each instance and urges the respective sled outwardly of the slide. Each sled is secured at its central portion to the respective sled 72 by a rivet 76.

Hereinafter for convenience the three sleds 72 will be referred to as 72a, 72b and 72c, it being understood that the plastic slide 67 moves along with the operating rod 64 and in such movement, the sleds accordingly move and ride over the inside surfaces of the adjustable side panels 56 and 57 and one of the integral cylinder side panels 51.

On the inner side of the adjustable side panel 56 is a pair of laterally spaced contacts 77 and 78 which are adapted to be engaged by the sled 72a during the movement of the slide 67, the sled thereby effecting an electrical connection between these two contacts as it rides thereover. The contact 78 is connected by a lead $k$ to a contact 79 on the manual switch and which, as shown, is given the legend F to designate the "forward" actuation of the reverse gear. The contact 77 is connected by a lead $l$ to one of the windings of the reversible motor 10a which operates a hydraulic pump as above described. As shown, the pump operating motor is suitably grounded.

On the stationary side panel 51 of the cylinder 50 which is engaged by the sled 72b are two pairs of laterally spaced contacts which are spaced longitudinally from each other. As shown, one pair of spaced contacts 80 and 81 is disposed in the path of travel of the sled 72b and from the contact 80 extends a lead $m$ to a contact 82 on the manual switch which bears the legend N designating the "neutral" position of the reverse gear. From the contact 81 extends a lead $n$ which joins the lead $l$ extending to one of the windings of the pump operating motor 10a.

The other set of contacts on the fixed panel 51 which are spaced longitudinally from the contacts 80 and 81 are contacts 83 and 84. The contact 83 is connected by a relatively short lead $m'$ which extends to the lead $m$ leading to the "neutral" contact 82 on the manual switch. The contact 84 is connected by a lead $o$ to the lead $p$ which extends to the other winding of the reversible motor of the pump operating motor 10a. Thus it will be understood that the sled 72b electrically connects either of the contacts 83 and 84 or the contacts 80 and 81, depending upon the position of the slide 67.

On the adjustable side panel 57 is a pair of laterally spaced contacts 85 and 86, the contact 85 having a lead $q$ which extends to a contact 87 on the manual switch which has the legend R designating the "reverse" operation of the reverse gear. Extending from the contact 86 is a lead $p$ which, as above mentioned, extends to the "neutral" contact 82 on the manual switch.

On the manual switch is a rockable arm 88 which may be manually operated and which is electrically connected to a battery 89 thereby to deliver current to the contacts 79, 82 and 87 respectively.

It will be understood that Figure 12 shows the position of the parts of the circuit selector after it has accomplished its forward movement so that the reverse gear is fully shifted to forward operating position. It will be seen that the connecting slide 72a has moved past the set of contacts 77 and 78 so that the electrical connection between these contacts has been broken and accordingly, the electric motor of the motor and pump unit 10a has automatically been deenergized. By shifting the switch arm 88 from the position shown in Figure 12 to that shown in Figure 13 where the switch arm is in engagement with the contact 82, current is then delivered from the battery 89 through the leads $m$ and $m'$ to the contact 83 which is electrically connected by the connecting sled 72b to the contact 84. The contact 84 is connected by the leads $o$ and $p$ to one set of windings of the electric motor which is proper to drive the pump in the direction to shift the operating rod 64 and associated parts to the left of the figure. Such operation or movement will be accomplished until the connection between the contacts 83 and 84 is broken by the connecting sled 72b passing thereover or to the position shown in Figure 13. On the other hand, it will be understood that when the switch arm 88 is moved from the position shown in Figure 14 in which it is in engagement with the reverse contact 87, to the contact 82 or the neutral contact, current will then pass from the battery 89 through the lead $m$ to the contact 80 which is connected by the sled 72b with the contact 81, the latter being connected by the leads $n$ and $l$ to such winding of the operating motor which serves to shift the operating rod 64 and associated parts back to its neutral position. Thus it will be apparent that whether the reverse gear is in its forward or reverse operating position, movement of the switch arm 88 to the neutral position serves to effect the shifting of the parts to the neutral position, the two sets of contacts 80 and 81, and 83 and 84 serving selectively to effect the desired electrical connection with the proper motor windings for achieving the desired movement of the parts.

In Figure 14, it will be understood that the reverse gear is in its reverse position, the switch arm 88 having been moved to engagement with the reverse contact 87, bringing current through the lead $q$ to the contact 85 which has previously been bridged by the sled 72c with the contact 86 carrying current through the lead $p$ to the proper winding of the reversible operating motor for shifting the parts to the desired reverse position for the reverse gear. In this connection, it should be mentioned that the pump delivers liquid under pressure to one end or the other of the operating cylinder such as shown on Figure 3, by which the reverse gear arm is shifted in one direction or the other, depending upon whether the liquid is forced into one end or the other of the cylinders to drive the piston in the appropriate direction.

It will be understood that by the manipulation of the adjusting screws 60, the side panels 56 and 57 may be selectively adjusted, thereby to position their respective contacts in the proper position with relation to the connecting sleds 72 of the slide 67. In this manner, the slides will engage the sets of contacts on the adjustable slides either in an advanced or retarded manner, depending upon the desired movement of the reverse gear operating arm as will be readily understood. The accessibility of the adjusting heads 62 of these screws enables the adjustment to be effected readily and conveniently after the circuit selector has been installed in position on the craft.

As shown in Figure 15, the reverse gear arm R' may be shifted to the desired position by a reversible electric motor which drives a shaft having a screw-threaded position, thereby effecting the desired adjustment of the reverse gear by electrical means alone instead of through hydro-electric means as above described. As shown in Figure 15, the reverse gear arm R' has intermediate its length an oscillatable nut 90 which receives the screw-threaded end portion of the operating rod described in connection with the circuit selector shown on Figures 8 to 14, the circuit selector 50 being shown in elevation in this figure and the opposite end portion of the circuit selector being pivotally mounted on a stationary bracket 91. Pivotally connected by a bracket arm 92 to the lower end of the bracket 91 is a reversible electric motor 93 which drives through reduction gearing 94 an elongate shaft 95 which has a screw-threaded end portion 96 in engagement with a threaded sleeve 97 oscillatably mounted on the outer end portion of the reverse gear arm R'. The circuit selector 50 operates as above described and the construction thereof is as above described, and through the selector the reversible motor 93 is driven in one direction or the other thereby to rock the reverse gear arm R' to the forward or rearward or neutral position as selected by the operator in the manipulation of the manual switch such as previously described.

It is believed that the construction and operation of the device as shown in Figure 15 from the above description will be entirely clear. Detail illustration of the circuit selector 50 is not considered necessary because it is identical to that above described and although the manual switch is not shown in this figure, it will be understood that a switch such as hereinbefore described will be employed in this connection also.

In Figure 16, a gear sector 98 is fixed to the reverse gear shaft 99, that being the shaft that controls the operation of the driven shaft, such for example as that upon which the reverse gear arm R and R' is mounted. Thus it will be understood that the turning of the shaft 99 in one direction or the other effects the drive whether it is forward or reverse or whether the clutch is in the neutral position. Depending from and rigid with the gear sector 98 is an arm 100 which has an oscillatably mounted sleeve 101 at its lower end. The sleeve 101 is screw-threaded to receive the threaded end portion of the operating shaft 64 of the circuit selector 50, such as above described in connection with Figures 8 to 14. The circuit selector 50 is pivoted to a stationary bracket 103 so that the circuit selector can rock to compensate for movements of the arm 100. The teeth of the sector 98 mesh with a drive pinion 102 which is driven from reduction gearing 104 operatively connected to a reversible electric motor 105. The motor 105 is shown secured by a band bracket 106 to an engine part 107.

Depending upon the direction of rotation of the motor 105, the gear sector 98 is rocked in one direction or the other and such rocking movement is transmitted to the operating rod 64 of the selector 50. It will be manifest that the circuit selector governs the direction of rotation of the motor 105 and deenergizes the same when the reverse gear shaft 99 has been given the proper rotational movement. Here again, the manual switch as described in connection with Figures 8 to 14 is employed in this connection also but detail description of the switch and the construction and operation of the circuit selector are not considered necessary in this connection in view of the description set forth above.

From the above it will be apparent that I have produced an exceedingly simple and efficient system for operating the reverse gear mechanism of a marine craft by which the usual manually operated levers and the like are eliminated with their attendant troubles and objection. Not only can the craft be handled with greater ease and agility but also with positive assurance and freedom from exertion and strain. The system is such that the response to the main control switch is instantaneous and the operator is assured that the neutral position of the gear is attained since the power unit at that time is deenergized. This is true also when either the reverse or forward position of the gear is reached, thus overcoming any possibility of imposing a strain on the parts since the circuit is broken in either position automatically at the proper time.

It is to be understood that numerous changes in details of construction, arrangement and operation may be effected without departing from the spirit of the invention especially as defined in the appended claims.

What I claim is:

1. In a system for controlling the drive between an engine and a propeller shaft, comprising a reverse gear control arm shiftable between forward, neutral, and reverse positions, a double acting fluid motor mechanically coupled to said arm for effecting movement thereof, a power unit operatively connected to drive said fluid motor in one direction or the other and including a reversible electric motor, a manual control switch, an automatic control device deriving movement from said control arm and including movable circuit making and breaking elements, and electrical connections between said electric motor, manual switch and automatic control device for effecting operation of the electric motor to cause the fluid motor to shift the control arm to a selected position predetermined by the manual switch whereupon the electric motor is deenergized in response to the action of the control device.

2. In a system for controlling the drive between an engine and a propeller shaft, comprising a reverse gear control arm shiftable between forward, neutral, and reverse positions, a double acting fluid motor mechanically coupled to said arm for effecting movement thereof, a power unit operatively connected to drive said fluid motor in one direction or the other and including a reversible electric motor, a manual control switch, an automatic control device deriving movement from said control arm and including a longitudinally shiftable member, contact elements relatively movable on said member, stationary contacts engageable respectively by the movable contact members, means on said member for effecting predetermined movement on said contact elements relative to the stationary controls, and electrical connections between said electric motor, manual switch and the stationary contacts of said automatic control device for enabling operation of said electric motor to cause the fluid motor to shift the control arm to a selected position predetermined by the manual switch and continue such operation until the respective contact members of the control device break the circuit to the electric motor.

3. In a system for controlling the drive between an engine and a propeller shaft, comprising a reverse gear control arm shiftable between forward, neutral, and reverse positions, a double acting fluid motor mechanically coupled to said arm for effecting movement thereof, a power unit operatively connected to drive said fluid motor in one direction or the other and including a reversible electric motor, a manual control switch, an automatic control device deriving movement from said control arm and including a longitudinally shiftable member, a pair of spaced stationary contacts electrically connected respectively to said manual switch and one field of the electric motor, another pair of spaced stationary contacts electrically connected respectively to said manual switch and the other field of the electric motor, spring-tensioned contact members relatively shiftable on said shiftable member for each pair of contacts respectively, and means on said member for moving one or the other contact members away from its stationary controls when the control arm has been moved to the position predetermined by said manual control switch thereby to stop the electric motor.

4. In a system for actuating the reverse-gear of a marine engine in which a rockable arm effects reverse gear operation, a double acting linear motor operatively connected to the reverse gear arm, a power unit for operating the linear motor and including a reversible electric motor, a manual control switch, a source of current, and means for establishing an operative connection between said switch, current source and the respective fields of the electric motor, said means comprising an automatic control device including a member movable with the reverse gear arm, three sets of stationary contacts leading respectively to said switch and the fields of said electric motor, contact elements on said movable member for engaging said sets of contacts respectively, and means responsive to the movement of said movable member for shifting one or another contact element away from its respective set to break the circuit when the reverse gear arm has reached a limit of movement.

5. In a system for actuating the reverse gear of a marine engine in which a rockable arm effects reverse gear operation, a double acting linear motor operatively connected to the reverse gear arm, a power unit for operating the linear motor and including a reversible electric motor, a three pole manual control switch, a source of current, and means for establishing an operative connection between said switch, current source and the respective fields of the electric motor, said means comprising a circuit selector including a member movable with the reverse gear arm, a set of stationary contacts electrically connected respectively to one pole of the switch and one field of the electric motor, a second set of stationary contacts electrically connected respectively to a second pole of the switch and the other field of the motor, an intermediate set of stationary contacts electrically connected to the third pole of the switch on the one hand and including two stationary contacts electrically connected respectively to the fields of the motor, contact elements shiftable on said movable member and respectively associated with said first and second set of contacts for either operatively connecting the switch with one field or the other of said motor in accordance with the actuation of the switch, a pusher for each shiftable contact element fixed to and movable with said movable member, an element on each side of said intermediate set of contacts and spring-tensioned toward same, and independently movable on said movable member, and means fixed to said movable member and arranged between said spring-tensioned members for holding same out of contact with said intermediate set in the intermediate or neutral position of the reverse gear arm and for moving one or the other spring-tensioned element away from said intermediate contact set upon movement of the movable member in one direction or the other thereby to enable the other spring-tensioned element to engage said intermediate contact set whereby upon movement of the manual switch to the third pole, one or the other field of the electric motor is energized to cause the linear motor to move the reverse gear arm to neutral or intermediate position.

6. The organization as claimed in claim 5, comprising spring seat means carried respectively by the first and second mentioned contact elements or the movable member, spring seat means carried respectively by said second contact elements, a coil spring interposed between each of said first and second spring seat means whereby the movement of the movable member compresses one or the other coil spring to urge the respective second mentioned movable element into engagement with contacts of the intermediate set.

7. The organization as claimed in claim 5, in which the movable member comprises an axially shiftable rod, and the pushers constitute catch means, and means for yieldably retaining said catch means in the extreme position of the rod either fore or aft, said catch means being constructed and arranged to afford limited lost motion.

8. The organization as claimed in claim 5, comprising stationary spring retaining means adjacent opposite ends of said movable member, and each pusher constituting a catch device on each end portion of the movable member for movement therewith and engageable by the respective retaining means for holding the reverse gear arm in either of its extreme positions of movement, said device including a member having limited lost motion relative to the movable member for enabling slight movement of the reverse gear arm.

9. The organization as claimed in claim 5, comprising stationary spring retaining means adjacent opposite ends of said movable member, and each pusher constituting a catch device longitudinally adjustable on each end portion of the movable member for movement therewith and engageable by the respective retaining means for holding the reverse gear arm in either of its extreme positions of movement, said device including a member having limited lost motion relative to the movable member for enabling slight movement of the reverse gear arm.

10. A circuit selector of the character described, comprising an elongate cylinder, end closures for said cylinder, a rod having end portions slidable through and beyond said closures, oppositely arranged pairs of contact posts adjacent each end of the cylinder having portions extending into same, a contact piece movable on each end portion of said rod for bridging the adjacent set of contact posts for establishing a circuit thereby, an intermediate set of contact posts on said cylinder comprising two pairs of laterally spaced oppositely arranged posts, a tensioned contact piece for each of said last pair of posts, a spacer secured to said rod and interposed between said last contact pieces for imparting movement thereto, springs between adjacent first and second mentioned contact pieces respectively, and an axially adjustable pusher at each end of the rod for engaging the adjacent first mentioned contact piece for actuating same.

11. The organization as claimed in claim 10, comprising a spring catch at each end of the cylinder for yieldably retaining the adjacent pusher upon engagement therewith, said pusher including a catch engaging element having limited lost motion relative to the rod.

12. Reverse gear operating system for marine power plants for shifting the reverse gear between neutral, forward and reverse operating positions, said system comprising power means coupled to the reverse gear for effecting such shifting movements and including a reversible electric motor, a manual control multipole switch, a source of electrical current, circuits between said current source, switch and motor for establishing predetermined movement of the reverse gear, a circuit selector having a relatively stationary part and a part shiftable by the reverse gear, sets of contacts on said stationary part with a contact of each set electrically connected to a pole of the manual switch and the other contact thereof electrically connected to one or the other fields of the reversible motor, means on said shiftable part for electrically connecting the contacts of each set for a predetermined period governed by the extent of movement of the shiftable part thereby to cause rotation of the motor in one direction or the other in response to the switch adjustment, and means individual to a set of contacts controlling one motor field and also to a set of contacts controlling the other motor field for adjusting the positions thereof for varying the point at which same are respectively engaged by said connecting means.

13. A circuit selector comprising an elongate housing rectangular in cross section and having a pair of oppositely arranged fixed side panels and a pair of oppositely arranged separate side panels, a mounting bracket for one end of the housing, means holding said separate panels in place but enabling longitudinal movement thereof, means to adjust said separate panels respectively, pairs of laterally spaced contacts on the inner face of each separate side panel and one of the fixed panels, a rod shiftable longitudinally within said cylinder, a block secured to an intermediate portion of said rod and slidable in said cylinder, and elongate contact plates carried by said slide block adapted to ride over said pairs of contacts respectively for establishing an electrical connection therebetween.

14. A circuit selector as claimed in claim 13, in which the panel adjusting means comprises a screw for each separate panel carried by the housing, an annular head fixed to the end of each screw, and a slot in each separate panel receiving a portion of the adjacent annular head.

15. A circuit selector as claimed in claim 13, in which the slide block is of plastic material, and a recessed portion in each of three sides of the block to receive the contact plates respectively.

16. A circuit selector as claimed in claim 15, in which each contact plate comprises an elongate one-piece metallic member having a pair of spaced contact-engaging flanges, and a spring for urging said member outwardly of its recessed portion.

17. Reverse gear operating system for marine power plants for shifting the reverse gear between neutral, forward and reverse operating positions, said system comprising power means coupled to the reverse gear for effecting such shifting movements and including a reversible electric motor, a shaft driven by said motor, a screw-threaded end portion on said shaft, an internally threaded sleeve engaging said threaded end portion, and a reverse gear operating arm carrying said sleeve, a manual control multipole switch, a source of electrical current, circuits between said current source, switch and motor for establishing predetermined movement of the reverse gear, and a circuit selector having a part shiftable by the reverse gear arm, said circuit selector comprising three sets of stationary contacts leading respectively to said switch and the fields of said electric motor, contact elements on said shiftable part for engaging said set of contacts respectively, and means responsive to the movement of said shiftable part for shifting one or another contact element away from its respective set to break the circuit when the reverse gear arm has reached a limit of movement.

18. Reverse gear operating system for marine power plants for shifting the reverse gear between neutral, forward and reverse operating positions, said system comprising power means coupled to the reverse gear for effecting such shifting movements and including a reversible electric motor, an oscillatable gear sector driven by said electric motor, said sector being fixedly connected at one end to the reverse gear shaft for oscillatably shifting same, and an arm projecting from said sector on the other side of said shaft, a manual control multipole switch, a source of electrical current, circuits between said current source, switch and motor for establishing predetermined movement of the reverse gear, and a circuit selector comprising three sets of stationary contacts leading respectively to said switch and the fields of said electric motor, contact elements on said shiftable part for engaging said set of contacts respectively, and means responsive to the movement of said shiftable part for shifting one or another contact element away from its respective set to break the circuit when the reverse gear arm has reached a limit of movement.

References Cited in the file of this patent

UNITED STATES PATENTS

| Number | Name | Date |
| --- | --- | --- |
| 2,270,581 | Clarke | Jan. 20, 1942 |
| 2,462,778 | Russell | Feb. 22, 1949 |
| 2,610,518 | Goedeke et al. | Sept. 16, 1952 |